United States Patent [19]

Stewart

[11] 4,280,356

[45] Jul. 28, 1981

[54] PIPELINE LEAK DETECTION

[75] Inventor: Thomas L. Stewart, Houston, Tex.

[73] Assignee: Shell Oil Company, Houston, Tex.

[21] Appl. No.: 57,248

[22] Filed: Jul. 13, 1979

[51] Int. Cl.³ .............................................. G01M 3/28
[52] U.S. Cl. ................................................. 73/40.5 R
[58] Field of Search .................................... 73/40.5 R

[56] References Cited

U.S. PATENT DOCUMENTS

| 3,505,513 | 4/1970 | Fowler et al. | 73/40 X |
| 3,667,285 | 6/1972 | Wright et al. | 73/40.5 R |
| 3,702,074 | 11/1972 | Mullen | 73/40.5 R |
| 3,711,689 | 1/1973 | Park | 73/40.5 R X |
| 3,723,987 | 3/1973 | Barone, Jr. et al. | 73/40.5 R X |
| 3,962,905 | 6/1976 | Jouve | 73/40.5 R |
| 3,987,662 | 10/1976 | Hara et al. | 73/40.5 R |
| 4,012,944 | 3/1977 | Covington et al. | 73/40.5 R |
| 4,043,355 | 8/1977 | Cerruti et al. | 73/40.5 R X |

*Primary Examiner*—Gerald Goldberg
*Assistant Examiner*—Joseph W. Roskos

[57] ABSTRACT

The present invention pertains to a process for detecting leaks in a pipeline when the flow is in a transient or steady condition. A mathematical model of the pipeline is constructed and real pressures and real flows are compared at various locations in the pipeline with predicted pressures and flows of the model at such locations. Leaks in the pipeline are indicated when upstream of the leak real pressure decreases and real flow increases with respect to the model and downstream of the leak real pressure decreases and real flow decreases with respect to the model.

7 Claims, 1 Drawing Figure

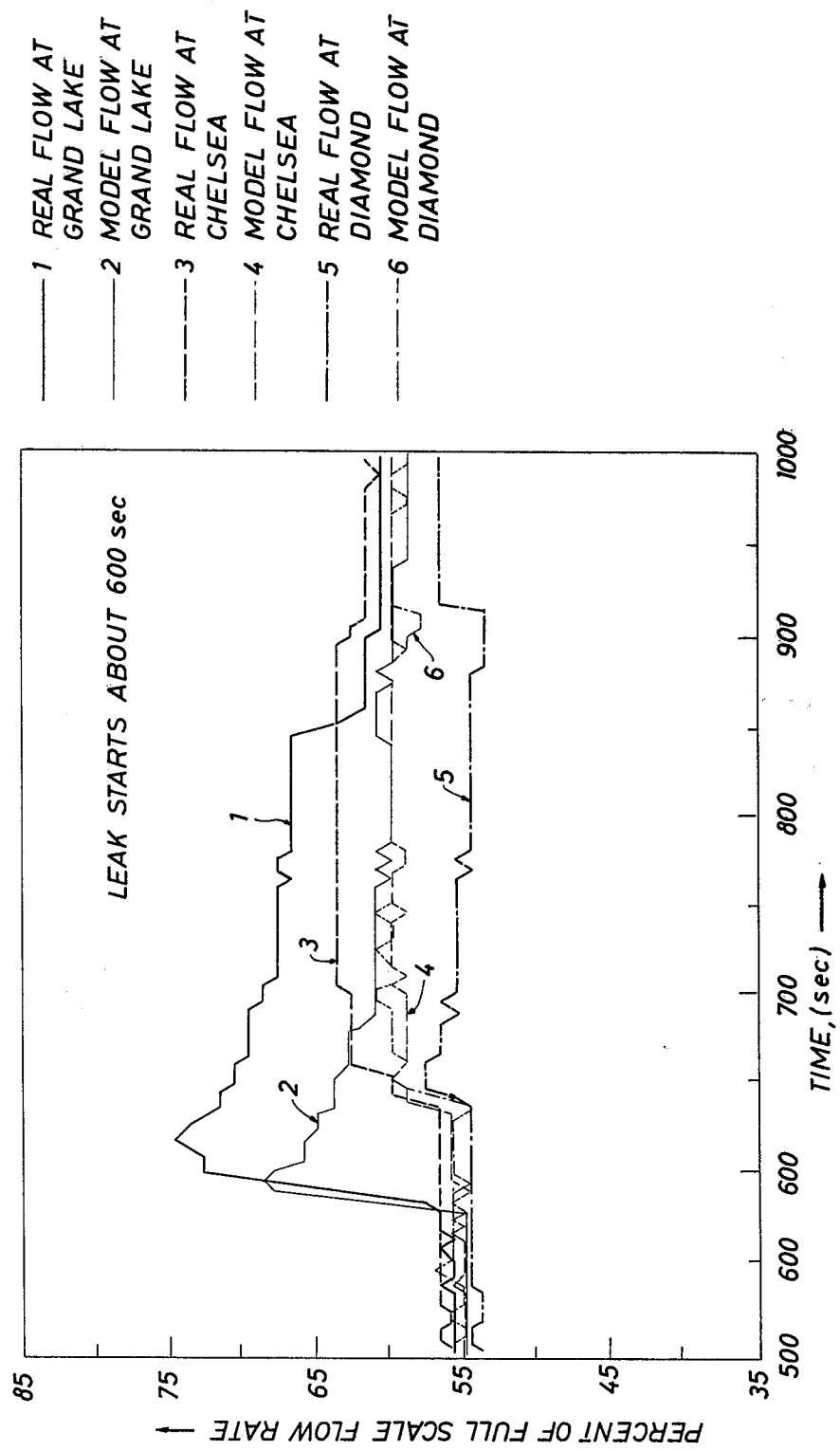

PIPELINE LEAK DETECTION

BACKGROUND OF THE INVENTION

Modern pipeline coatings are excellent and cathodic protection helps prevent small corrosion leaks from occurring as long as the coating is intact. Generally, pipeline leaks occur in older pipelines and on newer pipelines which are subject to random events such as washouts and wayward bulldozers.

To date, one of the more effective ways of detecting pipeline leaks has been by meter variance. In accordance with this technique, oil is metered into and out of the subject pipeline and the meter readings are compared. Since meters never completely agree, a problem is determining whether the meter disagreement is a leak and not one of other reasons for variance.

For most pipelines at this time, leaks are monitored by other methods which include periodic checks and other continuous monitors. Periodic checks include pressure testing, line walking, air patrol and sonic pigs. Continuous monitoring includes pressure monitoring, rate of flow monitoring, and over and short calculations. With respect to the latter, at given time intervals, input volume, output volume, and line pack are calculated and corrected for pressure and temperature. When the calculation shows a shortage, a leak is indicated. Large, computer-controlled pipelines utilize computerized over and short calculations as part of the pipeline accounting. Of course, over and short calculation is really a meter variance system with a long period between checks.

The above described meter variance is one of the more precise means for continuous leak detection. Meter variance may be conducted with computers or without. Such non-computer leak detectors are known as meter flow comparators which include a digital differential counter which continuously totals input and output volumes and calculates the difference over a moving time period. Two differential comparisons take place, one over a short period and one over a long period. Temperature and line packing effects are expected to compensate out over the long time period.

By comparison, a computer-based leak detector includes features which allow it to perform better than the simple flow comparator. These features include compensation for line packing, compensation for temperature, predictable meter factor change, improved signal transmission, better interpretation of alarms, and easy future expansion. Precise determination of line packing requires knowledge of the pressure profile along the pipeline, flow rate into and out of the pipeline, temperature profile along the pipeline, fluid gravity, viscosity, and meter factor variation with the above properties. Such a program is quite complex and its complexity is part of the problem with such devices for detecting leaks. Although the computer-based leak detector is superior to the flow comparator, there is still room for considerable improvement. The present invention is computer-based but omits many of the complexities of the prior art systems and provides a reliable and accurate system for leak detection.

The prior art includes the following articles:

V. L. Streeter and B. Wylie, "Hydraulic Transients", McGraw Hill, New York, 1967, Pages 22–62;

L. Bergeron, "Water Hammer in Hydraulics and Wave Surges in Electricity", John Wiley & Sons, New York, 1961;

Frank J. Berto, "Computer Aids Line-Leak Detection", The Oil & Gas Journal, Dec. 3, 1973.

SUMMARY OF THE INVENTION

The present invention provides a process for detecting leaks in a pipeline when the flow is in a transient or steady condition. The transient condition, or as it also may be termed, the unsteady condition, is brought about by hydraulic transients or surges caused by pump starts and stops, valves opening or closing, or flow changes at multiple inlets and outlets to the pipeline.

Essentially, the present invention involves comparing a model pipeline with a real pipeline. As known conditions are changed in the real pipeline, such conditions are also mathematically changed in the model pipeline, so that no differences are recognized between the two. A minor difference may simply reflect a temporary difference where a pump has started or stopped. However, a difference that persists implies a leak.

More particularly, the present invention provides a process for detecting leaks in a pipeline when the flow is in a transient or steady condition, or in a steady condition, by constructing a mathematical model of the pipeline, comparing real pressures and real flows at various locations in the pipeline with predicted pressures and flows of the model at such locations and denoting a leak in the pipeline when upstream of the leak real pressure decreases and real flow increases with respect to the model, and downstream of the leak real pressure and real flow decrease with respect to the model.

DESCRIPTION OF THE DRAWINGS

FIG. 1 provides a comparison of model and real flow indicating a leak as set forth in Example 1. The leak occurs at Grand Lake during a pump start together with flow response at neighboring stations Chelsea and Diamond.

DESCRIPTION OF PREFERRED EMBODIMENTS

In accordance with the process of the present invention, pipeline leaks are detected by running a mathematical model of a pipeline continuously and concurrently with the real pipeline. If a leak occurs, the pressure and/or flow in the real pipeline will deviate from that in the model pipeline.

Recognition of a leak is simple for a steady condition pipeline, i.e., when there is a loss of pressure, it is due to a leak. It is not simple to determine a leak in an unsteady condition pipeline where pressures and flow rates are constantly changing due to pump starts and stops, changes in flow rate in multiple delivery and intake lines, and changes in valves.

The model is a computer program that dynamically simulates the real pipeline as to pressure, velocity, the effect of friction and any transient effects of momentum and elasticity. The model receives information concerning driving pressures in the real pipeline: (1) at the inlet and outlet ends of the pipeline, and (2) at the inlet and outlet of each booster station between. Conversely, if the real pipeline contains positive displacement pumps at any of these locations the model receives flow information rather than pressure. The model calculates any unknown pressures at inlet, outlet, and booster stations, and at several points between stations, at frequent intervals, e.g., every 1 to 10 seconds or longer. Meanwhile, the computer scans the real pipeline pressures and flows at a rate similar to that of the model's calculations.

The model and real pressures and flows are compared continuously. So long as no leak exists, the small, if any, difference between the real and model flows and pressures will remain essentially constant.

The process of the present invention is practiced in accordance with the following computer program sequence:

| Read: | Pressure and flow at all measurements points |
|---|---|
| Step (1) | Calculate: |
| | Flow at all pressure-specified boundary points (inlets and/or outlets), if any. |
| | and |
| | Pressure at all flow-specified boundary points (inlets and/or outlets), if any. |
| | and |
| | Flow at all pressure-specified intermediate booster pump stations, if any. |
| | and |
| | Pressure at all flow-specified intermediate booster pump stations, if any. |
| | and |
| | Average pressure and flow at all pump pressure rise-specified booster pump stations, if any. |
| | and |
| | Pressure and flow at multiple points between pumping stations and/or measuring points. |
| Step (2) | Compare, at all measuring points and define error between: |
| | Model pressure and real pressure |
| | and |
| | Model flow and real flow |
| | and |
| | Model average pressure and real average pressure at pump pressure rise-specified booster pump stations, if any. |
| Step (3) | Search: |
| | For adjacent measuring points that exhibit: |
| | Decreased real pressure or average pressure compared with model or average pressure. Increased real flow compared with model flow at the upstream point |
| | and |
| | Decreased real flow compared with model flow at the downstream point |
| | and |
| | Persistence of the above combination. If true, activate alarm. |
| Step (4) | Locate: |
| | Leak based on difference of time of detection at the two measuring points. |
| | or |
| | Difference in indicated leak rate at the two measuring points. |
| | or |
| | Difference in the integrated indicated leak volume at the two measuring points. |
| Step (5) | Calculate: |
| | Leak rate as the sum of the two indicated leak rates. |
| Step (6) | Report: |
| | Leak location and rate. |
| Step (7) | Return: |
| | To Step number (1). |

As shown by the following example, a real time dynamic model for an actual pipeline was demonstrated to be able to detect a leak of as little as 3% of flow in the presence of transient flow changes occurring during a pump startup.

EXAMPLE

A leak was imposed by opening a drain line gate valve as quickly as possible after starting of a pump. Gauging of a sump tank indicated that the leak rate was 900 barrels per hour or 10% of the flow. Presence of the leak could not be detected by reading of the pressure and flow record charts. The accumulated data (suction pressure, discharge pressure, and flow for the 11 pump stations on the pipeline at 5-second intervals for 25 minutes) was then run in parallel with a model such as above described.

FIG. 1 is a copy of a plot produced by a computer controlled plotter of actual and model flow rate for the Chelsea, Grand Lake and Diamond stations of the Ozark Pipeline. The flow increase caused by starting the pump at Grand Lake shows clearly just before 600 seconds and at Chelsea and Diamond about 1 minute later. Decrease in flow at Grand Lake near 850 seconds betrays shut-off of the leak. The persistent difference between actual and model flow at the three stations indicates a leak. Additional necessary confirmation of the leak is the comparison between model and real flow at the neighboring stations. Real flow is greater than model flow at Chelsea, upstream, and less at Diamond, downstream. This confirms a leak between Chelsea and Diamond (flow measurements at the leak site would normally not be available). Noting that, for this case, wave travel time to the furtherest adjacent flow meter is 1 minute, if we assume 30-second persistence as a criteria for leak confirmation, this leak was detected in 1.5 minutes. A smaller leak down to about 3%, or possibly less, e.g., 1%, of flow would have been detected in the same manner and in the same time. Still smaller leaks would have to be detected by periodic inventory balances.

What is claimed is:

1. A process for detecting leaks in a pipeline when the flow is in a transient or steady condition comprising receiving information concerning real pressures and real flows at the inlet and outlet ends of the pipeline, predicting pressures and flows at various locations in the pipeline, comparing real pressures and real flows at the various locations in the pipeline with the predicted pressures and flows at such locations, and denoting a leak in the pipeline when upstream of the leak real pressure decreases and real flow increases with respect to the predicted pressure and flow and downstream of the leak real pressure decreases and real flow decreases with respect to the predicted pressure and flow.

2. The process of claim 1 wherein comparisons are made between the predicted pipeline pressures and flows and the real pipeline pressures and flows at intervals of from about 1 second to about 10 seconds.

3. The process of claim 1 wherein the pipeline has pump stations and information is received concerning real pressures and real flows at the inlet and outlet ends of the pump stations.

4. The process of claim 3 wherein leaks smaller than one percent are detected by periodic inventory balances.

5. The process of claim 1 wherein the spacing between said various locations varies from about 5 miles to about 100 miles.

6. The process of claim 1 wherein the pipeline contains a liquid, gas, or two or three-phase mixtures of solids, liquids and gasses.

7. The process of claim 1 wherein the predicted pressures and flows are based on the effects of friction, momentum and elasticity.

* * * * *